United States Patent
Suzuki

(10) Patent No.: US 6,934,547 B2
(45) Date of Patent: Aug. 23, 2005

(54) PORTABLE TELEPHONE WITH MOVING STATUS DETECTION FUNCTION

(75) Inventor: Isao Suzuki, Tokyo (JP)

(73) Assignee: NEC Corporation, Tokyo (JP)

( * ) Notice: Subject to any disclaimer, the term of this patent is extended or adjusted under 35 U.S.C. 154(b) by 638 days.

(21) Appl. No.: 09/775,618

(22) Filed: Feb. 5, 2001

(65) Prior Publication Data

US 2001/0012781 A1 Aug. 9, 2001

(30) Foreign Application Priority Data

Feb. 3, 2000 (JP) ........................................ 2000-026022

(51) Int. Cl.$^7$ ................................................. H04Q 7/20
(52) U.S. Cl. ...................... 455/441; 455/444; 455/456.6
(58) Field of Search .......................... 455/435.1, 435.2, 455/432.1, 422.1, 441, 444, 515, 516, 456.6, 569.1, 567, 413, 450, 62, 412.1, 456.1, 238.1, 436, 455; 320/252, 347, 329; 324/175

(56) References Cited

U.S. PATENT DOCUMENTS

| | | | | |
|---|---|---|---|---|
| 5,548,806 A | * | 8/1996 | Yamaguchi et al. | 455/441 |
| 5,711,005 A | * | 1/1998 | Farrag | 455/441 |
| 5,778,030 A | * | 7/1998 | Bruckert et al. | 375/317 |
| 5,787,348 A | * | 7/1998 | Willey et al. | 455/441 |
| 5,884,178 A | * | 3/1999 | Ericsson et al. | 455/441 |
| 5,898,926 A | * | 4/1999 | Konishi | 455/441 |
| 5,990,676 A | * | 11/1999 | Hori | 324/175 |
| 6,067,460 A | * | 5/2000 | Alanara et al. | 455/574 |
| 6,108,532 A | * | 8/2000 | Matsuda et al. | 455/413 |
| 6,163,534 A | * | 12/2000 | Wang | 370/347 |
| 6,285,884 B1 | * | 9/2001 | Vaara | 455/441 |
| 6,292,660 B1 | * | 9/2001 | Hartless et al. | 455/434 |
| 6,311,078 B1 | * | 10/2001 | Hardouin | 455/567 |
| 6,330,446 B1 | * | 12/2001 | Mori | 455/435.2 |
| 6,421,538 B1 | * | 7/2002 | Byrne | 455/441 |
| 6,496,709 B2 | * | 12/2002 | Murray | 455/569.1 |
| 6,532,223 B1 | * | 3/2003 | Sakoda et al. | 370/337 |
| 6,542,745 B1 | * | 4/2003 | Mottier et al. | 455/441 |
| 6,577,603 B1 | * | 6/2003 | Hakalin et al. | 370/252 |
| 6,640,115 B1 | * | 10/2003 | Fujimoto et al. | 455/567 |

FOREIGN PATENT DOCUMENTS

| | | |
|---|---|---|
| EP | 0 812 119 A2 | 12/1997 |
| JP | 9-307953 A | 11/1997 |
| JP | 10-108263 | 4/1998 |
| JP | 10-157555 | 6/1998 |
| JP | 10-224856 | 8/1998 |
| JP | 10-224856 A | 8/1998 |
| JP | 10-224865 A | 8/1998 |
| JP | 11-252628 A | 9/1999 |
| JP | 2000-32142 A | 1/2000 |

* cited by examiner

Primary Examiner—Charles N. Appiah
(74) Attorney, Agent, or Firm—Sughrue Mion, PLLC

(57) ABSTRACT

A portable telephone allowing easy and accurate estimation of its moving speed at the moment when an incoming call is received is disclosed. A moving status detector is provided which detects a moving status of the portable telephone based on measured reception signal strengths, each of which is measured on a sequentially selected one of N neighboring radio channels that are previously designated by the base station at a timing other than a communication timing of the designated radio channel in response to receipt of a call setup signal for an incoming call from the base station using the designated radio channel.

16 Claims, 6 Drawing Sheets

WHEN TRAVELING AT HIGH SPEEDS

WHEN TRAVELING AT LOW SPEED OR AT REST

PORTABLE TELEPHONE WITH MOVING STATUS DETECTION FUNCTION

BACKGROUND OF THE INVENTION

1. Field of the Invention

The present invention relates to a portable telephone with a moving status detection function, and in particular to a movement detection technique of determining by the portable telephone itself whether it is at rest or moving at high speeds during incoming call reception operation.

2. Description of the Prior Art

With the recent widespread use of portable telephones, it is observed now and then that use of portable telephones gives neighboring persons trouble depending on the using environment. It is also known that use of the portable telephone during driving of a car may cause a traffic accident. It is therefore required that one should observe the rules of etiquette and secure the safety at the time of using the portable telephone during driving of the car or in a train.

Japanese Patent Laid-Open No. 10-224856 discloses an example of mobile communication terminal equipment designed to observe such etiquette. The mobile communication terminal is provided with a reception electric-field intensity detector and a fading pitch detection circuit that determines from the reception electric-field intensity whether a moving speed of the terminal exceeds a predetermined value or not. Then, a response controller determines whether the terminal is moving at high speed or not, based on a determination of the fading pitch detection circuit. When the determination of the response controller shows that the terminal is moving at high speed, the terminal automatically responds to an incoming call, sends a response message to the opposite party of the communication. And the terminal stores a message received from the opposite party in a memory.

Japanese Patent Laid-Open No. 10-157555 discloses another example of an apparatus with a function of calculating moving speed. In the portable telephone apparatus disclosed therein, a radio section detects a time variation of electric field intensity of a radio signal received through an antenna. Then, a computation section calculates the moving speed of the own portable telephone in the mobile unit based on this variation. And the computation section determines whether the portable telephone apparatus is being used in the running car or not, depending on this moving speed and regulates outgoing and incoming calls of the portable telephone apparatus based on the decision. Further, a location detection section detects the current location using radio waves from GPS (Global Positioning System) satellites. Then, the computation section calculates the moving speed of the own portable telephone apparatus in the mobile station based on this current location. And the computation section determines whether the portable telephone apparatus is being used in the running vehicle, based on this moving speed. Outgoing and incoming calls of the portable telephone apparatus are regulated based on the determination.

Japanese Patent Laid-Open No. 10-108263 discloses a similar prior art. In the radio communication apparatus disclosed therein, a received signal strength detector measures an RSSI value at predetermined intervals. The RSSI value takes a value corresponding to reception field intensity of a radio channel. The amount of variation of this RSSI is converted to the moving speed of the radio communication apparatus. And, whether the radio communication apparatus is traveling at low speed or at high speed is determined based on the moving speed. Outgoing and incoming calls of the radio communication apparatus are regulated based on the determination. And, therein, a method of reducing moving speed determination errors is disclosed. In the method, the radio communication apparatus is accumulating the amount of variation of RSSI a predetermined number of times or during a predetermined period of time. And the radio communication apparatus converts the amount of the accumulation to a velocity value.

Incoming call receiving operation sequence control of a portable telephone according to a prior art will be explained by referring to FIG. 1.

In FIG. 1, while the portable telephone is on standby waiting for communication, if a caller calls the portable telephone, then a call signal is sent to a base station (step a2). In response to the call signal, the base station sends a paging signal to the portable telephone (step b2).

The portable telephone receives the paging signal from the base station and analyzes it. The portable telephone determines whether the received paging signal is addressed to itself or not. When it is determined that the paging signal is addressed to itself, the portable telephone sends a radio status report signal as a response signal to the base station (step c2). Then, upon receipt of this radio status report signal, the base station selects a communication radio channel suitable for the portable telephone and sends a radio channel designation signal to the portable telephone (step d2).

Upon receipt of the radio channel designation signal, the portable telephone switches to the radio channel designated by the base station. And then, the portable telephone receives a call setup signal from the base station (step e2). When receiving the call setup signal, the portable telephone sends a call signal in response to the call setup signal to the base station (step f2). Upon receipt of the call signal from the portable telephone, the base station sends the caller side a ringing tone indicating that the portable telephone is being called actually (step g2).

Furthermore, the incoming call is displayed on a display device of the portable telephone. When the user takes the incoming call, the portable telephone sends a response signal to the base station (step i2). In response to the response signal, the base station sends a response acknowledgment signal back to the portable telephone (step m2). The above sequence allows voice communication between the portable telephone and the caller.

Such a portable telephone having a function of estimating the own moving speed is already known. However, estimation of the moving speed according to the prior art is performed at regular intervals. Therefore, the estimated moving speed does not always match the moving speed when an incoming signal is actually received. In other words, there is a possibility that the portable telephone may operate based on an incorrect estimation result. For example, the estimation may indicate that the portable telephone is not moving at high speed although the portable telephone is actually moving at high speed, and vice versa.

Furthermore, from the standpoint of the user of the portable telephone according to the prior art, it is necessary to preset functions adaptable to conditions during driving of a car before actually driving the car. For example, once the portable telephone is set to a mode of "during driving", a ringing tone stops thereafter. Such a setting or cancellation of the setting is required at the start and end of driving of a car. Thus, if such a presetting that indicates "during driving" is not canceled, there may be cases where voice communication is prevented even if the user is actually not driving a car. The opposite case can also be occurred. In the case, a ringing tone may suddenly sound even if the user is actually driving a car and may provoke an operation error.

SUMMARY OF THE INVENTION

An object of the present invention is to provide a moving status detecting method and a portable telephone allowing detection of its moving status without the need of any additional functions such as detecting the moving speed by using GPS or receiving location information from a base station.

Another object of the present invention is to provide a moving status detecting method and a portable telephone allowing easy and accurate estimation of its moving speed at the moment when an incoming call is received.

Further another object of the present invention is to provide a moving status detecting method and a portable telephone capable of automatically detecting whether the portable telephone itself is traveling or not, without making a presetting that the user is prevented from responding to any call during operation, before starting to drive the car.

Still another object of the present invention is to provide a moving status detecting method and a portable telephone capable of efficiently and accurately measuring reception electric field intensity.

According to an aspect of the present invention, a method for determining a moving status of a portable telephone, includes the steps of: a) receiving a call setup signal for an incoming call from a base station using a designated radio channel; b) measuring a reception signal strength on a sequentially selected one of N radio channels that are previously designated by the base station at a timing other than a communication timing of the designated radio channel, where N is an integer greater than 1; and c) determining a moving status of the portable telephone based on measured reception signal strengths.

The step (c) may include the steps of: c.1) repeating the step (b) for the N radio channels M times, where M is an integer greater than 1; c.2) calculating a variation in reception signal strength between a previously measured reception signal strength and a currently measured reception signal strength for a sequentially selected one of the N radio channels; and c.3) determining a moving status of the portable telephone based on accumulated variation over M sets of N reception signal strengths.

The step (c.3) may include the steps of: when the accumulated variation is smaller than a predetermined threshold, determining that the portable telephone is not moving at high speeds; and when the accumulated variation is not smaller than a predetermined threshold, determining that the portable telephone is moving at high speeds.

The step (c) may includes the steps of: c.1) repeating the step (b) for the N radio channels M times, where M is an integer greater than 1; c.2) selecting at least one radio channel from the N radio channels, said at least one radio channel having a reception signal strength greater than a minimum permissible level; c.3) calculating a variation in reception signal strength between a previously measured reception signal strength and a currently measured reception signal strength for said at least one radio channel; c.4) calculating an average variation by dividing accumulated variation by M; and c.5) determining a moving status of the portable telephone based on the average variation.

The step (c.5) may include the steps of: when the average variation is smaller than a predetermined threshold, deter-mining that the portable telephone is not moving at high speeds; and when the average variation is not smaller than a predetermined threshold, determining that the portable telephone is moving at high speeds.

Preferably, the portable telephone communicates with the base station in TDMA (time division multiple access) scheme, wherein a next timing for transmission and reception is relatively determined by a current timing for transmission and reception. In TDMA scheme, the step (b) may include the steps of: b.1) switching a communication channel from the designated radio channel to a sequentially selected radio channel of the N radio channels at an idle timing between adjacent timings for transmission and reception of the designated radio channel; b.2) measuring a reception signal strength on the sequentially selected radio channel; and b.3) switching a communication channel from the sequentially selected radio channel back to the designated radio channel after a lapse of the idle time.

According to another aspect of the present invention, a portable telephone includes: a transceiver for receiving and transmitting radio signals from and to a base station using a radio channel designated by the base station; a reception level measuring circuit for measuring a reception signal intensity on a currently selected radio channel; and a moving status detector for detecting a moving status of the portable telephone based on measured reception signal strengths, each of which is measured on a sequentially selected one of N neighboring radio channels that are previously designated by the base station at a timing other than a communication timing of the designated radio channel in response to receipt of a call setup signal for an incoming call from the base station using the designated radio channel.

The portable telephone may further include a controller controlling the transceiver so that the portable telephone communicates with the base station in TDMA (time division multiple access) scheme, wherein a next timing for transmission and reception is relatively determined by a current timing for transmission and reception.

The controller may switch a communication channel from the designated radio channel to a sequentially selected radio channel of the N radio channels at an idle timing between adjacent timings for transmission and reception of the designated radio channel and, after a lapse of the idle time used to measure a reception signal strength on the sequentially selected radio channel, and switches a communication channel from the sequentially selected radio channel back to the designated radio channel.

The portable telephone may further include: a display circuit for displaying necessary information on screen; an alert circuit for alerting a user to occurrence of an incoming call; a controller controlling the display circuit and the alert circuit such that when the moving status detector determines that the portable telephone is not moving at high speeds, both the display circuit and the alert circuit are activated, and, when the moving status detector determines that the portable telephone is moving at high speeds, the alert circuit is not activated but the display.

DETAILED DESCRIPTION OF THE PREFERRED EMBODIMENTS

Figure 1:
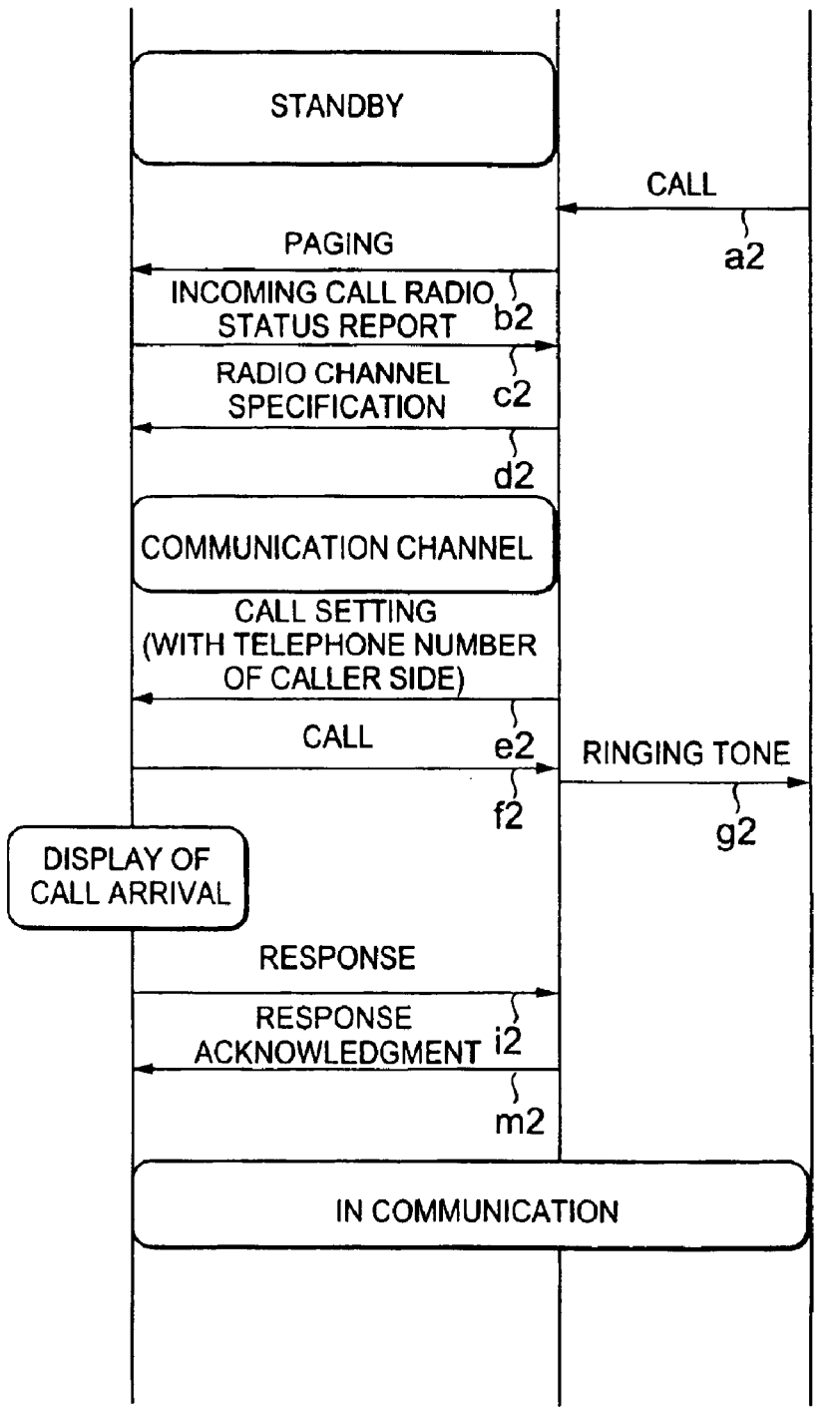
FIG. 1 is a diagram showing an incoming call sequence of a conventional portable telephone.
Figure 2:
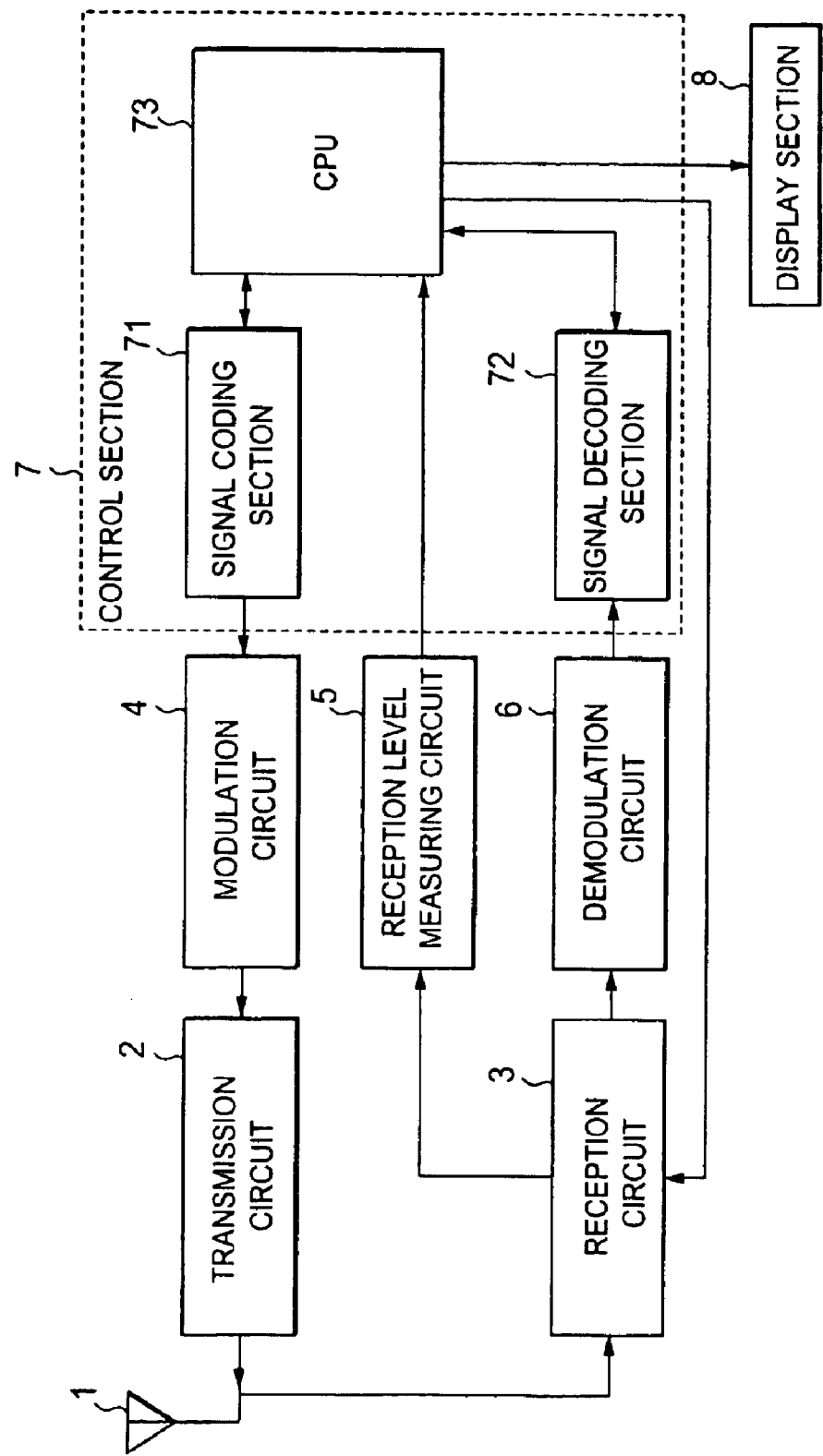
FIG. 2 is a block diagram showing a configuration of a portable telephone according to an embodiment of the present invention.

Referring to FIG. 2, a portable telephone according to an embodiment of the present invention includes an antenna 1 that captures a radio signal into the portable telephone when a base station (not shown) calls the portable telephone, a reception circuit 3 that receives the radio signal captured through the antenna 1, and a demodulation circuit 6 that demodulates the signal received by the reception circuit 3 to produce a received digital signal. A combination of the reception circuit 3 and demodulation circuit 6 forms a receiving means.

The portable telephone further includes a modulation circuit 4 that modulates a carrier signal according to a transmission digital signal received from a control section 7 to produce a transmission signal that can be transmitted over a radio channel, and a transmission circuit 2 that transmits the transmission signal received from the modulation circuit 4 as a radio signal. A combination of the transmission circuit 2 and modulation circuit 4 forms a transmitting means.

The portable telephone is further provided with a reception level measuring circuit 5 that measures a reception electric field intensity of the received signal on the currently used radio channel. The portable telephone is configured in such a way that the measurement result is output from the reception level measuring circuit 5 to the control section 7.

The portable telephone is further provided with a display section 8 that displays a status of the portable telephone according to the output of the control section 7 for the user of the portable telephone. The control section 7 controls the reception circuit 3, the modulation circuit 4 and the display section 8. The control section 7 includes a signal decoding section 72 that decodes a reception digital signal received from the demodulation circuit 6 to produce received data, a signal coding section 71 that encodes transmission data to produce a transmission digital signal, and a program-controlled processor (here, called CPU) 73 that controls the signal decoding section 72 and signal coding section 71 and analyzes a reception signal level measured by the reception level measuring circuit 5.

Operation

An operation of this embodiment will be described with reference to FIG. 2 to FIG. 6, taking a TDMA (Time division multiple access)-based digital portable telephone as an example.

Figure 5:
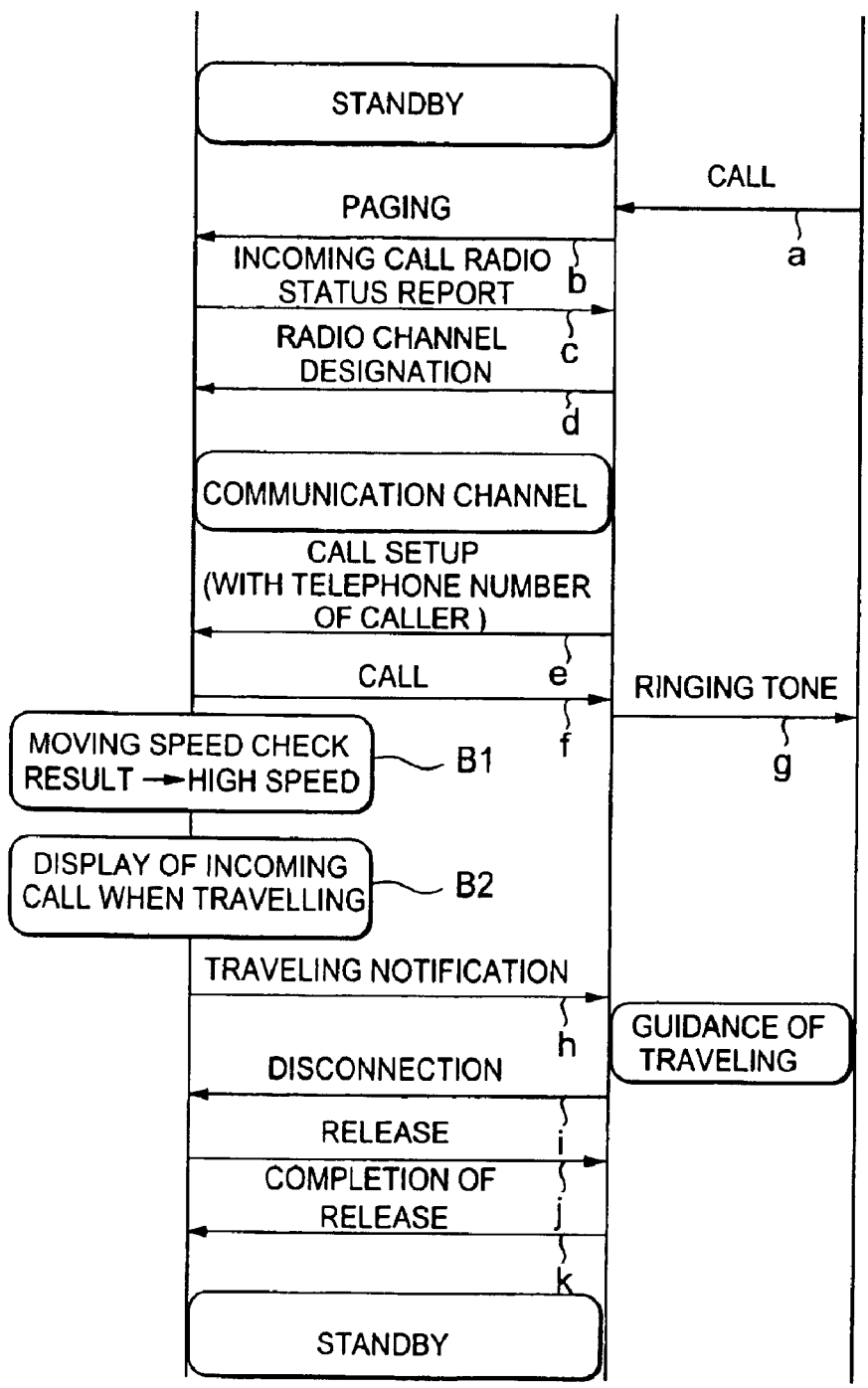
FIG. 5 is a diagram showing a sequence control when traveling at high speed according to the embodiment of the present invention.

Referring to FIG. 5, it is assumed that the portable telephone is on standby, that is, waiting for an incoming call while periodically receiving a broadcast signal from a base station. Here, the broadcast signal includes information designating a plurality of available radio channels.

When a user on the calling side calls the portable telephone, a call signal is notified to a base station (step a). Then, the base station sends a paging signal to the portable telephone (step b).

The portable telephone captures the paging signal from the base station through the antenna 1 and receives the radio signal by the reception circuit 3. The demodulation circuit 6 demodulates the received signal into a reception digital signal and sends the demodulated signal to the control section 7. The control section 7 decodes the reception digital signal through the signal decoding section 72 and the CPU 73 analyzes the decoded signal and recognizes it as a paging signal addressed to the own portable telephone.

The CPU 73 sends a radio condition report signal as a response signal to the paging signal (step c). More specifically, the signal coding section 71 encodes the radio condition report signal to output it to the modulation circuit 4. The modulation circuit 4 converts the coded radio condition report signal to a radio transmission signal, which is transmitted to the base station through the transmission section 2 and the antenna 1.

Upon receipt of the radio condition report signal from the portable telephone, the base station selects a communication radio channel suitable for the portable telephone and sends a radio channel designation signal to the portable telephone (step d).

When the portable telephone receives the radio channel designation signal from the base station, the control section 7 controls the reception circuit 3 so that the reception circuit 3 can receive a radio signal having a frequency of the designated radio channel. After the channel is switched to the radio channel designated by the base station, the reception circuit 3 receives a call setup signal from the base station (step e). The call setup signal includes in most cases the telephone number of the caller though this depends on the telephone type on the caller side.

After receiving the call setup signal, the portable telephone sends a call signal as a response signal to the call setup signal to the base station (step f). Upon receipt of the call signal from the portable telephone, the base station sends a ringing tone to the caller to inform the caller that the portable telephone takes the call (step g). After sending the call signal to the base station, the reception level measuring circuit 5 of the portable telephone measures a reception electric field intensity of each of the neighboring radio channels previously specified by the base station at the timings as shown in FIG. 3.

Hereafter, the transmission/reception timing will be described in the case where the portable telephone is traveling at high speed.

Figure 3:
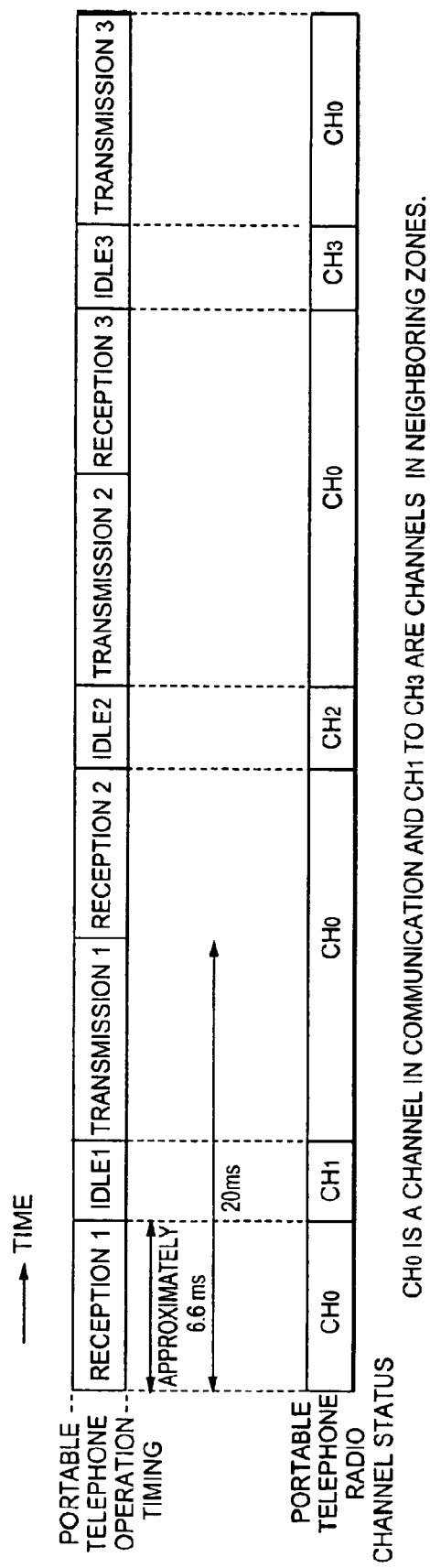
FIG. 3 is a timing chart showing the timing of measuring a received signal intensity on a plurality of radio channels near the currently used channel.

As shown in FIG. 3, reception of a signal from the base station and transmission of a signal to the base station by the portable telephone are performed at different timings. In FIG. 3, the receiving timing "Reception 1" is a time period during which the portable telephone can continuously receive a radio signal from the base station and is a period of approximately 6.6 milliseconds. The timing of "Transmission 1" to transmit a signal to the base station is specified by the timing of "Reception 1".

Between "Reception 1" and "Transmission 1" exists a no-communication segment (displayed as "Idle" in FIG. 3). The CPU 73 performs frequency changeover control on the reception circuit 3 at the timings of the start and end of the above-described idle period. Assuming that a radio channel specified by the base station is a channel CH0, the CPU 73 measures reception electric field intensity of the channel CH1, one of the neighboring radio channels, using the reception level measuring circuit 5. Furthermore, the CPU 73 performs changeover control on the reception circuit 3 again so that the frequency of the radio channel CH0 can be received at the timing of the next transmission. Thus, the TDMA-based digital portable telephone repeats "reception", "idle" and "transmission" at intervals of 20 milliseconds. And the portable telephone measures reception electric field intensity of a sequential one of the neighboring radio channels specified by the network side every 20 milliseconds.

Next, an algorithm of checking the moving speed of the portable telephone by the CPU 73 will be described referring to FIG. 4.

The CPU 73 starts the moving speed check processing of the portable telephone at a timing after transmission of a call signal. First, the CPU 73 initializes a register (SUM), channel counter n and measurement counter m so that SUM=0 and n=m=1 (step A1). The register SUM is used to store an accumulation value of variations in measured reception electric field intensity on the neighboring radio channels. The channel counter n is used to count the number of neighboring radio channels subjected to the measurement. The measurement counter m is used to count the number of times the measurement has been made in a predetermined time period.

The CPU 73 stores a reception electric-field intensity measured within an idle time by the reception level measuring circuit 5 into a register called RSSI (step A2). The CPU 73 then determines whether the measurement of reception electric field intensity is the first measurement, that is, m=1 (step A3). If it is the first measurement (YES at step A3), the CPU 73 transfers the measured reception field intensity stored in the RSSI to a variable CHn1 (step A4). Here, the measured reception electric field intensity of one of the neighboring radio channels is represented by CHnm, where "n" and "m" are explained above. Therefore, CHn1 means the value of reception electric field intensity measured at a n-th selected one of the neighboring radio channels in the case of m=1. Thereafter, the CPU 73 increments the channel counter n by 1 (step A5).

The CPU 73 then determines whether the channel counter n exceeds the number (N) of the neighboring radio channels: n>N, that is, the above transfer from RSSI to CHn1 has completed for all the neighboring radio channels (step A6). Then, if the above transfer operation has not completed for the number of neighboring radio channels to be measured, the CPU 73 selects a subsequent one of the neighboring radio channels and repeats the steps A2–A5 until n>N, that is, the first (m=1) measurement has been completed for all of the N neighboring radio channels to be measured. After the first measurement has been completed for the N neighboring radio channels to be measured (YES at step A6), the CPU 73 increments the measurement counter m by 1 (step A7) and initializes the channel counter n to 1 (step A8) before going back to the step A2.

Then, the CPU 73 starts the 2nd (m=2) measurement of reception electric field intensity of each of the neighboring radio channels. In this case, since the measurement counter m is not 1 (NO at step A3), the CPU 73 transfers the measured reception field intensity from the RSSI to CH12 where n=1 and m=2 (step A9). Thereafter, the CPU 73 calculates SUM=SUM+|CHnm−CHn(m−1)| (step A10). In this case, the CPU 73 calculate the absolute value of a difference between the RSSI of the 1st measurement (CH11) and that of the 2nd measurement (CH12) for the same neighboring radio channel CH1) and adds the calculated absolute value to the SUM to produce an updated SUM.

The CPU 73 then increments the channel counter n (step A11) and determines whether the above transfer operation has completed for the N neighboring radio channels to be measured, that is, n>N (step A12). If it is determined that the above transfer operation has not been completed, the CPU 73 repeats the steps A2, A3, A9 to A11 until the above transfer operation has been completed. If the transfer operation has been completed for the neighboring radio channels to be measured (YES at step A12), the CPU 73 increments the measurement counter m by 1 (step A13) and resets the channel counter n to 1 (step A14).

In this manner, the CPU 73 repeats the steps A2, A3, A9 to A14 until the measurement counter m reaches the predetermined measurement times M (step A15). When the measurement counter m exceeds the predetermined measurement times M (YES at step A15), the CPU 73 compares the resultant SUM with an empirically predefined threshold (step A16). If the SUM is equal to or greater than the threshold (YES at step A16), the CPU 73 determines that the portable telephone is traveling at high speeds (step A17) because the accumulated variation of reception electric field intensities is large. If the SUM is smaller than the threshold (NO at step A16), the CPU 73 determines that the portable telephone is traveling at low speed or at rest (step A18) because the accumulated variation of reception field intensities is small. Thereafter, the moving speed check procedure is terminated.

Going back to FIG. 5, when the CPU 73 determines that the portable telephone is traveling at high speeds (step B1), the CPU 73 displays the telephone number of the caller and call arrival time on the display section 8 of the portable telephone (step B2). At the same time, the CPU 73 outputs a high-speed traveling notification signal to the signal coding section 71 so as to notify the base station that the portable telephone is traveling at high speeds. The high-speed traveling notification signal is transmitted to the base station through the transmission means (step h in FIG. 5). When receiving the high-speed traveling notification signal from the portable telephone, the base station announces to the caller that the portable telephone is traveling at high speeds.

Thereafter, the base station sends a disconnection signal to terminate communication to the portable telephone (step i). When the portable telephone receives the disconnection signal from the base station, the CPU 73 outputs a release signal to the signal coding section 71. The signal coding section 71 outputs a coded release signal to the modulation circuit 4. The modulation circuit 4 modulates this release signal and the transmission circuit 2 transmits the modulated release signal to the base station via the antenna 1 (step j).

Upon receipt of the release signal from the portable telephone, the base station sends a release completion signal back to the portable telephone as a response to the release signal (step k). And the portable telephone is placed in a standby state.

Figure 6:
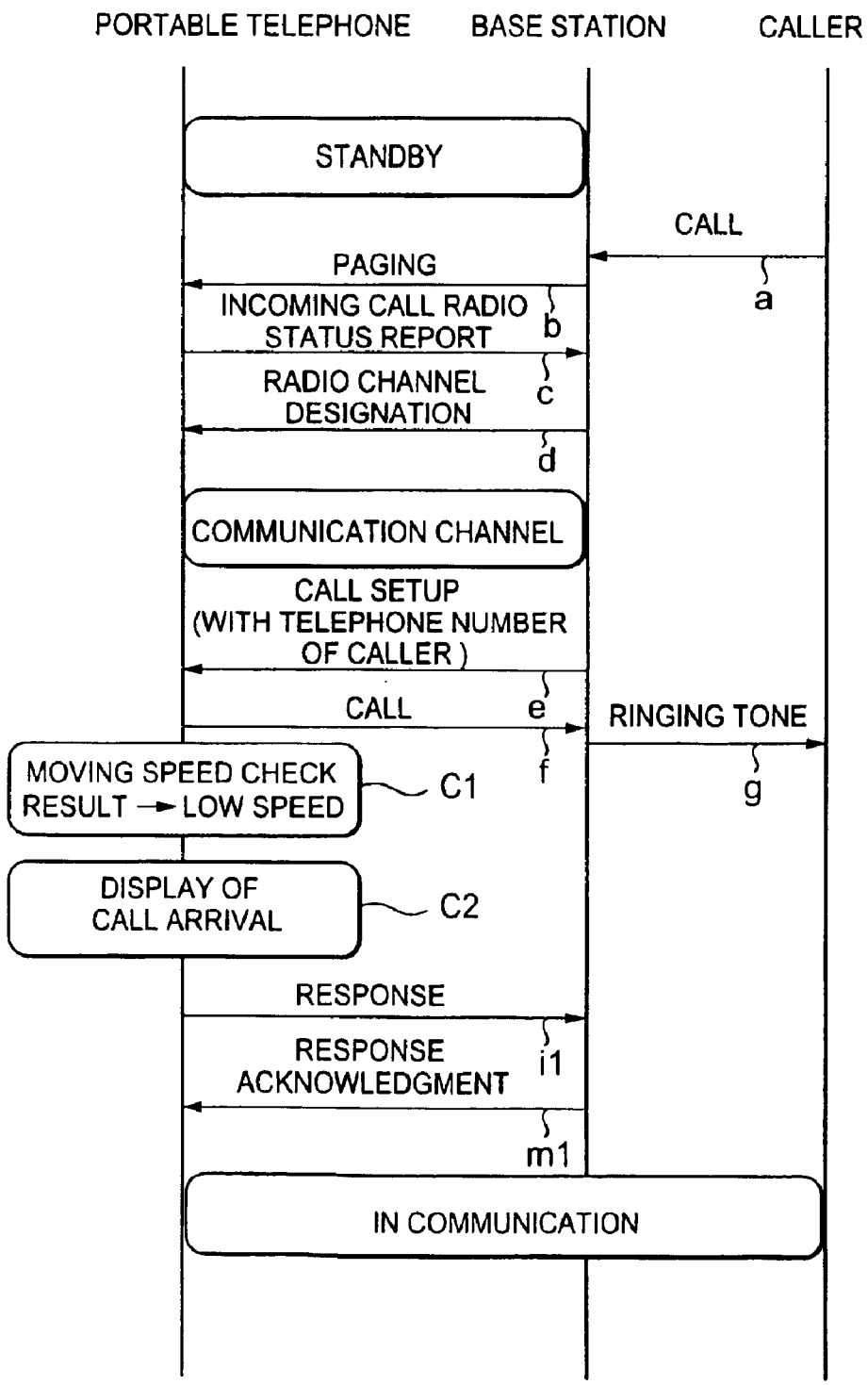
FIG. 6 is a diagram showing a sequence control when being at rest according to the embodiment of the present invention.

FIG. 6 illustrates a sequence control when it is determined that the portable telephone is traveling at low speeds or at rest, where the same sequence control as indicated by the steps a to g in FIG. 5 is denoted by the same reference symbol and the details will be omitted.

Referring to FIG. 6, if it is determined that the portable telephone is traveling at low speeds or at rest (step C1), normal incoming call occurrence is displayed on the display section 8 (step C2). However, the high-speed traveling notification signal described above is not notified to the base station. Also in the case, the above-described notification indicating that the portable telephone is traveling is not announced to the caller. Then, after operation of response to the incoming call by the user, the CPU 73 sends a response signal to the base station (step 11). In response to this response signal, the base station sends a response acknowledgment signal to the portable telephone (step m1). And thereby it is possible to enter into voice communication and the portable telephone can communicate with the caller via the base station.

Figure 4:
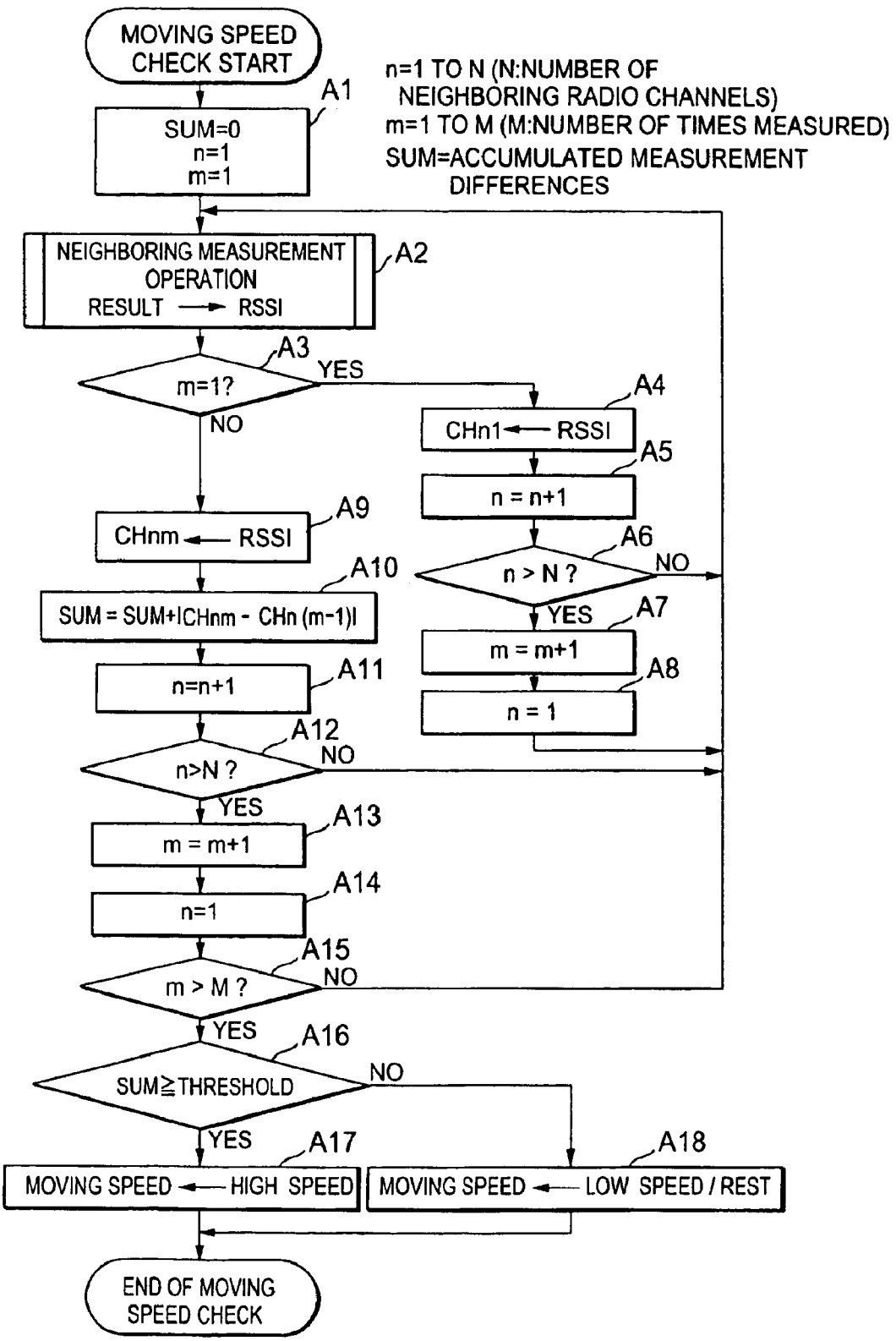
FIG. 4 is a flow chart showing an algorithm of moving speed decision of the portable telephone according to the embodiment of the present invention.

Another embodiment of the present invention can be formed by changing a portion of the moving speed detection algorithm as shown in FIG. 4. In FIG. 4, the absolute value of a variation of reception electric field intensity for a sequentially selected radio channel between a currently measured and the previously measured ones is accumulated for all the neighboring radio channels. However, the present invention is not limited to such a moving speed detection algorithm.

For example, it is also possible to accumulate the absolute values of variations of reception electric field intensity for only neighboring radio channels having a reception electric field intensity equal to or higher than a minimum level necessary to receive signals by the portable telephone. And an average value is calculated by dividing the accumulated variation value by the number of times the measurement has been carried out. Thus the moving speed of the portable telephone can be estimated by comparing the average variation value with a predetermined threshold as described above. Using such a moving speed detection algorithm makes it possible to eliminate the undesired variation components of reception electric field intensity caused by unnecessary channels, disturbance noise, etc.

As described above, the portable telephone according to the present invention measures the reception electric field intensity for a plurality of neighboring radio channels specified by the base station beforehand through the reception level measuring circuit at intervals over time. Then, the portable telephone compares the accumulated absolute values of variations of the measurement results with an empirically predefined threshold and determines whether the portable telephone is traveling at high speeds or not. This allows the portable telephone itself to estimate the moving speed at a time when an incoming call is received. This also allows the portable telephone to estimate the moving speed using only the function already provided for the portable telephone. That is, the portable telephone requires no additional functions such as detecting the moving speed using GPS or sending location information from the base station, making it possible to easily check the moving speed of the portable telephone.

Moreover, the user of the portable telephone need not set beforehand so that the user is prevented from responding to a call during operation of the car. Even in the case where the user forgets to make such a setting beforehand, the portable telephone itself can automatically detect that the portable telephone is traveling. Further, suppressing a ringing tone, etc. can prevent operation errors due to a sudden incoming call tone. Furthermore, while traveling in a train, etc., automatically suppressing an incoming call beep sound also has effects from the standpoint of etiquette. Furthermore, controlling the reception section beforehand so as to match the radio channel specified when a radio channel specification signal is received makes it possible to efficiently and accurately measure reception electric field intensity.

What is claimed is:

1. A method for determining a moving status of a portable telephone, comprising:
   a) receiving a call setup signal for an incoming call from a base station using a designated radio channel;
   b.1) measuring a reception signal strength on a sequentially selected one of N radio channels that are previously designated by the base station at a timing other than a communication timing of the designated radio channel, where N is an integer greater than 1;
   b.2) measuring a reception signal strength on a sequentially selected second of N radio channels at timings other than the communication timing of the designated radio channel and the timing of measuring the selected one of N radio channels and prior to the selected one of N radio channels being measured for a second time; and
   c) determining a moving status of the portable telephone based on measured reception signal strengths.

2. The method according to claim 1, wherein the portable telephone communicates with the base station in TDMA (time division multiple access) scheme, wherein a next timing for transmission and reception is relatively determined by a current timing for transmission and reception.

3. The method according to claim 2, wherein (b) comprises:
   b.3) switching a communication channel from the designated radio channel to a sequentially selected radio channel of the N radio channels at an idle timing between adjacent timings for transmission and reception of the designated radio channel;
   b.4) measuring a reception signal strength on the sequentially selected radio channel; and
   b.5) switching a communication channel from the sequentially selected radio channel back to the designated radio channel after a lapse of the idle time.

4. A method for determining a moving status of a portable telephone, comprising:
   a) receiving a call setup signal for an incoming call from a base station using a designated radio channel;
   b) measuring a reception signal strength on a sequentially selected one of N radio channels that are previously designated by the base station at a timing other than a communication timing of the designated radio channel, where N is an integer greater than 1; and
   c) determining a moving status of the portable telephone based on measured reception signal strengths;
   wherein (c) comprises:
   c.1) repeating (b) for the N radio channels M times, where M is an integer greater than 1;
   c.2) calculating a variation in reception signal strength between a previously measured reception signal strength and a currently measured reception signal strength for a sequentially selected one of the N radio channels; and
   c.3) determining a moving status of the portable telephone based on accumulated variation over M sets of N reception signal strengths.

5. The method according to claim 4, wherein (c.3) comprises:
   when the accumulated variation is smaller than a predetermined threshold, determining that the portable telephone is not moving at high speeds; and
   when the accumulated variation is not smaller than a predetermined threshold, determining that the portable telephone is moving at high speeds.

6. A method for determining a moving status of a portable telephone, comprising:
   a) receiving a call setup signal for an incoming call from a base station using a designated radio channel;

b) measuring a reception signal strength on a sequentially selected one of N radio channels that are previously designated by the base station at a timing other than a communication timing of the designated radio channel, where N is an integer greater than 1; and c) determining a moving status of the portable telephone based on measured reception signal strengths;

wherein (c) comprises:

c.1) repeating (b) for the N radio channels M times, where M is an integer greater than 1;

c.2) selecting at least one radio channel from the N radio channels, said at least one radio channel having a reception signal strength greater than a minimum permissible level;

c.3) calculating a variation in reception signal strength between a previously measured reception signal strength and a currently measured reception signal strength for said at least one radio channel;

c.4) calculating an average variation by dividing accumulated variation by M; and c.5) determining a moving status of the portable telephone based on the average variation.

7. The method according to claim 6, wherein (c.5) comprises:

when the average variation is smaller than a predetermined threshold, determining that the portable telephone is not moving at high speeds; and when the average variation is not smaller than a predetermined threshold, determining that the portable telephone is moving at high speeds.

8. A portable telephone comprising:

a transceiver for receiving and transmitting radio signals from and to a base station using a radio channel designated by the base station;

a reception level measuring circuit for measuring a reception signal intensity on a currently selected radio channel; and a moving status detector for detecting a moving status of the portable telephone based on measured reception signal strengths, each of which is measured on a sequentially selected one of N neighboring radio channels that are previously designated by the base station at timings other than a communication timing of the designated radio channel and the timing during which the non-selected N neighboring channel channels are being measured, in response to receipt of a call setup signal for an incoming call from the base station using the designated radio channel.

9. The portable telephone according to claim 8, further comprising:

a controller controlling the transceiver so that the portable telephone communicates with the base station in TDMA (time division multiple access) scheme, wherein a next timing for transmission and reception is relatively determined by a current timing for transmission and reception.

10. The portable telephone according to claim 9, wherein the controller switches a communication channel from the designated radio channel to a sequentially selected radio channel of the N radio channels at an idle timing between adjacent timings for transmission and reception of the designated radio channel and, after a lapse of the idle time used to measure a reception signal strength on the sequentially selected radio channel, and switches a communication channel from the sequentially selected radio channel back to the designated radio channel.

11. A portable telephone comprising:

a transceiver for receiving and transmitting radio signals from and to a base station using a radio channel designated by the base station;

a reception level measuring circuit for measuring a reception signal intensity on a currently selected radio channel; and a moving status detector for detecting a moving status of the portable telephone based on measured reception signal strengths, each of which is measured on a sequentially selected one of N neighboring radio channels that are previously designated by the base station at a timing other than a communication timing of the designated radio channel in response to receipt of a call setup signal for an incoming call from the base station using the designated radio channel;

wherein the moving status detector repeats measurement of reception signal strengths for the N radio channels M times, calculates a variation in reception signal strength between a previously measured reception signal strength and a currently measured reception signal strength for a sequentially selected one of the N radio channels, and detects a moving status of the portable telephone based on accumulated variation over M sets of N reception signal strengths.

12. The portable telephone according to claim 11, wherein when the accumulated variation is smaller than a predetermined threshold, the moving status detector determines that the portable telephone is not moving at high speeds and, when the accumulated variation is not smaller than a predetermined threshold, the moving status detector determines that the portable telephone is moving at high speeds.

13. The portable telephone according to claim 12, further comprising:

a display circuit for displaying necessary information on screen;

an alert circuit for alerting a user to occurrence of an incoming call;

a controller controlling the display circuit and the alert circuit such that when the moving status detector determines that the portable telephone is not moving at high speeds, both the display circuit and the alert circuit are activated, and when the moving status detector determines that the portable telephone is moving at high speeds, the alert circuit is not activated but the display.

14. A portable telephone comprising:

a transceiver for receiving and transmitting radio signals from and to a base station using a radio channel designated by the base station;

a reception level measuring circuit for measuring a reception signal intensity on a currently selected radio channel; and a moving status detector for detecting a moving status of the portable telephone based on measured reception signal strengths, each of which is measured on a sequentially selected one of N neighboring radio channels that are previously designated by the base station at a timing other than a communication timing of the designated radio channel in response to receipt of a call setup signal for an incoming call from the base station using the designated radio channel;

wherein the moving status detector repeats measurement of reception signal strengths for the N radio channels M times, selects at least one radio channel from the N radio channels, said at least one radio channel having a reception signal strength greater than a minimum permissible level, calculates a variation in reception signal strength between a previously measured reception signal strength and a currently measured reception signal strength for said at least one radio channel, calculates an average variation by dividing accumulated variation by M, and determines a moving status of the portable telephone based on the average variation.

15. The portable telephone according to claim 14, wherein when the average variation is smaller than a predetermined threshold, the moving status detector determines that the portable telephone is not moving at high speeds and, when the average variation is not smaller than a predetermined threshold, the moving status detector determines that the portable telephone is moving at high speeds.

16. The portable telephone according to claim 15, further comprising:
- a display circuit for displaying necessary information on screen;
- an alert circuit for alerting a user to occurrence of an incoming call;
- a controller controlling the display circuit and the alert circuit such that
- when the moving status detector determines that the portable telephone is not moving at high speeds, both the display circuit and the alert circuit are activated, and
- when the moving status detector determines that the portable telephone is moving at high speeds, the alert circuit is not activated but the display.

* * * * *